(12) United States Patent
Yong et al.

(10) Patent No.: US 8,591,730 B2
(45) Date of Patent: Nov. 26, 2013

(54) BAFFLE PLATES FOR AN ULTRAVIOLET REACTOR

(75) Inventors: Zhee Min Jimmy Yong, Singapore (SG); David Stibitz, Colorado Springs, CO (US); Bruce Lee Coulter, Rockford, IL (US); Michael Scott Hoosier, Colorado Springs, CO (US)

(73) Assignee: Siemens Pte. Ltd., Singapore (SG)

( * ) Notice: Subject to any disclaimer, the term of this patent is extended or adjusted under 35 U.S.C. 154(b) by 664 days.

(21) Appl. No.: 12/845,432

(22) Filed: Jul. 28, 2010

(65) Prior Publication Data

US 2011/0024365 A1 Feb. 3, 2011

Related U.S. Application Data

(60) Provisional application No. 61/230,040, filed on Jul. 30, 2009, provisional application No. 61/230,045, filed on Jul. 30, 2009.

(51) Int. Cl.
*B01J 19/12* (2006.01)
*C02F 1/32* (2006.01)
*A61L 2/10* (2006.01)

(52) U.S. Cl.
USPC .................. 210/153; 210/748.1; 210/748.11; 210/748.01; 210/760; 210/602; 422/186; 422/186.3; 422/24; 422/37; 205/436; 205/437; 205/432; 205/428; 205/435

(58) Field of Classification Search
USPC .............. 210/748.01, 748.1, 748.11, 167.21, 210/167.22, 167.26, 602, 760; 422/37, 1, 422/261.186, 186.3, 24; 205/436, 437, 205/432 R, 434, 428, 435
See application file for complete search history.

(56) References Cited

U.S. PATENT DOCUMENTS

| | | |
|---|---|---|
| 2,008,684 A | 7/1935 | Craddock |
| 2,212,260 A | 8/1940 | Brothman |
| 2,249,263 A | 7/1941 | Wheelwright, Jr. |
| 2,268,461 A | 12/1941 | Nichols |
| 2,556,014 A | 6/1951 | Tolman |
| 2,651,582 A | 9/1953 | Courtney |
| 2,686,110 A | 8/1954 | Carver |
| 2,740,696 A | 4/1956 | Longwell |
| 3,252,689 A | 5/1966 | Blomgren, Sr. et al. |
| 3,319,937 A | 5/1967 | Wilson et al. |

(Continued)

FOREIGN PATENT DOCUMENTS

| CA | 10-79423 A1 | 6/1980 |
|---|---|---|
| CN | 1098960 | 2/1995 |

(Continued)

OTHER PUBLICATIONS

"Acu-Trol Programmable Controllers," Product Literature from www.acu-trol.com, printed Nov. 19, 1999.

(Continued)

*Primary Examiner* — Joseph Drodge
*Assistant Examiner* — Cameron J Allen

(57) ABSTRACT

An ultraviolet reactor for treating a fluid. The reactor includes a vessel having an inlet for receiving fluid and an outlet for discharging fluid. The reactor further includes an ultraviolet light source and baffle plates. The baffle plates include holes arranged in a predetermined pattern for providing plug flow in areas in the reactor near the ultraviolet light source.

6 Claims, 8 Drawing Sheets

(56) References Cited

U.S. PATENT DOCUMENTS

| | | |
|---|---|---|
| 3,389,970 A | 6/1968 | Scheibel |
| 3,536,646 A | 10/1970 | Hatch et al. |
| 3,559,959 A | 2/1971 | Davis et al. |
| T0896051 I4 | 3/1972 | Hamlin et al. |
| 3,702,298 A | 11/1972 | Zsoldos et al. |
| 3,742,735 A | 7/1973 | Verreyne et al. |
| 3,747,899 A | 7/1973 | Latinen et al. |
| 3,756,570 A | 9/1973 | Buhner |
| 3,794,817 A | 2/1974 | Shinskey |
| 3,852,234 A | 12/1974 | Venema |
| 3,870,631 A | 3/1975 | Fassell et al. |
| 3,965,027 A | 6/1976 | Boffardi et al. |
| 4,016,078 A | 4/1977 | Clark |
| 4,087,360 A | 5/1978 | Faust et al. |
| 4,113,688 A | 9/1978 | Pearson |
| 4,125,574 A | 11/1978 | Kastner et al. |
| 4,146,676 A | 3/1979 | Saeman et al. |
| 4,171,166 A | 10/1979 | Trowbridge et al. |
| 4,217,145 A | 8/1980 | Gaddis |
| 4,218,147 A | 8/1980 | Rosenberger |
| 4,233,265 A | 11/1980 | Gasper |
| 4,234,440 A | 11/1980 | Hirozawa et al. |
| 4,241,016 A | 12/1980 | Hirozawa et al. |
| 4,243,636 A | 1/1981 | Shiraki et al. |
| 4,277,438 A | 7/1981 | Ejzak |
| 4,300,909 A | 11/1981 | Krumhansl |
| 4,340,489 A | 7/1982 | Adams et al. |
| 4,402,836 A | 9/1983 | Fochtman et al. |
| 4,433,701 A | 2/1984 | Cox et al. |
| 4,456,512 A | 6/1984 | Bieler et al. |
| 4,470,907 A | 9/1984 | Sencza |
| 4,522,502 A | 6/1985 | Brazelton |
| 4,550,011 A | 10/1985 | McCollum |
| 4,575,678 A | 3/1986 | Hladky |
| 4,581,074 A | 4/1986 | Mankina et al. |
| 4,648,043 A | 3/1987 | O'Leary |
| 4,664,528 A | 5/1987 | Rodgers et al. |
| 4,701,055 A | 10/1987 | Anderson |
| 4,719,252 A | 1/1988 | Dutton et al. |
| 4,747,978 A | 5/1988 | Loehr et al. |
| 4,752,740 A | 6/1988 | Steininger |
| 4,798,702 A | 1/1989 | Tucker |
| 4,863,608 A | 9/1989 | Kawai et al. |
| 4,913,822 A | 4/1990 | Chen et al. |
| 4,952,376 A | 8/1990 | Peterson |
| 4,965,016 A | 10/1990 | Saitoh et al. |
| 4,977,292 A | 12/1990 | Hwa et al. |
| 4,990,260 A | 2/1991 | Pisani |
| 5,000,866 A | 3/1991 | Woyciesjes |
| 5,004,549 A | 4/1991 | Wood et al. |
| 5,018,871 A | 5/1991 | Brazelton et al. |
| 5,024,766 A | 6/1991 | Mahmud |
| 5,030,334 A | 7/1991 | Hale |
| 5,032,218 A | 7/1991 | Dobson |
| 5,061,456 A | 10/1991 | Brazelton et al. |
| 5,069,885 A | 12/1991 | Ritchie |
| 5,073,268 A | 12/1991 | Saito et al. |
| 5,112,521 A | 5/1992 | Mullins et al. |
| 5,116,509 A | 5/1992 | White |
| 5,118,422 A | 6/1992 | Cooper et al. |
| 5,130,033 A | 7/1992 | Thornhill |
| 5,135,968 A | 8/1992 | Brazelton et al. |
| 5,139,627 A | 8/1992 | Eden et al. |
| 5,164,429 A | 11/1992 | Brazelton et al. |
| 5,213,694 A | 5/1993 | Craig |
| 5,230,822 A | 7/1993 | Kamel et al. |
| 5,236,602 A | 8/1993 | Jackson |
| 5,239,257 A | 8/1993 | Muller et al. |
| 5,256,307 A | 10/1993 | Bachhofer et al. |
| 5,262,963 A | 11/1993 | Stana et al. |
| 5,302,356 A | 4/1994 | Shadman et al. |
| 5,306,355 A | 4/1994 | Lagana |
| 5,306,432 A | 4/1994 | Puetz |
| 5,316,031 A | 5/1994 | Brazelton et al. |
| 5,320,748 A | 6/1994 | Dupuis |
| 5,332,511 A | 7/1994 | Gay et al. |
| 5,348,665 A | 9/1994 | Schulte et al. |
| 5,352,359 A | 10/1994 | Nagai et al. |
| 5,382,367 A | 1/1995 | Zinkan et al. |
| 5,422,013 A | 6/1995 | Hirofuji |
| 5,422,014 A | 6/1995 | Allen et al. |
| 5,424,032 A | 6/1995 | Christensen et al. |
| 5,443,991 A | 8/1995 | Godec et al. |
| 5,470,480 A | 11/1995 | Gray et al. |
| 5,489,344 A | 2/1996 | Martin et al. |
| 5,494,588 A | 2/1996 | LaZonby |
| 5,501,801 A | 3/1996 | Zhang et al. |
| 5,518,629 A | 5/1996 | Perez et al. |
| 5,571,419 A | 11/1996 | Obata et al. |
| 5,575,920 A | 11/1996 | Freese et al. |
| 5,587,069 A | 12/1996 | Downey, Jr. |
| 5,639,476 A | 6/1997 | Oshlack et al. |
| 5,658,467 A | 8/1997 | LaZonby et al. |
| 5,675,153 A | 10/1997 | Snowball |
| 5,683,654 A | 11/1997 | Dallmier et al. |
| 5,736,097 A | 4/1998 | Ono |
| 5,753,106 A | 5/1998 | Schenck |
| 5,770,039 A | 6/1998 | Rigney et al. |
| 5,779,912 A | 7/1998 | Gonzalez-Martin et al. |
| 5,783,092 A | 7/1998 | Brown et al. |
| 5,785,845 A | 7/1998 | Colaiano |
| 5,785,867 A | 7/1998 | LaZonby et al. |
| 5,790,934 A | 8/1998 | Say et al. |
| 5,798,271 A | 8/1998 | Godec et al. |
| 5,800,732 A | 9/1998 | Coughlin et al. |
| 5,814,233 A | 9/1998 | Starkey et al. |
| 5,814,247 A | 9/1998 | Derule et al. |
| 5,820,256 A | 10/1998 | Morrison |
| 5,849,985 A | 12/1998 | Tieckelmann et al. |
| 5,855,791 A | 1/1999 | Hays et al. |
| 5,858,246 A | 1/1999 | Rafter et al. |
| 5,858,249 A | 1/1999 | Higby |
| 5,866,013 A | 2/1999 | Kessler et al. |
| 5,882,526 A | 3/1999 | Brown et al. |
| 5,888,374 A | 3/1999 | Pope et al. |
| 5,895,565 A | 4/1999 | Steininger et al. |
| 5,902,751 A | 5/1999 | Godec et al. |
| 5,947,596 A | 9/1999 | Dowd |
| 5,972,196 A | 10/1999 | Murphy et al. |
| 5,980,758 A | 11/1999 | LaZonby et al. |
| 5,985,155 A | 11/1999 | Maitland |
| 6,015,484 A | 1/2000 | Martinchek et al. |
| 6,030,842 A | 2/2000 | Peachey-Stoner |
| 6,045,706 A | 4/2000 | Morrison et al. |
| 6,068,012 A | 5/2000 | Beardwood et al. |
| 6,090,296 A | 7/2000 | Oster |
| 6,096,283 A | 8/2000 | Cooper et al. |
| 6,106,770 A | 8/2000 | Ohki et al. |
| 6,120,619 A | 9/2000 | Goudiakas et al. |
| 6,120,698 A | 9/2000 | Rounds et al. |
| 6,132,593 A | 10/2000 | Tan |
| 6,143,184 A | 11/2000 | Martin et al. |
| 6,146,538 A | 11/2000 | Martin |
| 6,149,819 A | 11/2000 | Martin et al. |
| 6,159,552 A | 12/2000 | Riman et al. |
| 6,238,555 B1 | 5/2001 | Silveri et al. |
| 6,284,144 B1 | 9/2001 | Itzhak |
| 6,315,950 B1 | 11/2001 | Harp et al. |
| 6,409,926 B1 | 6/2002 | Martin |
| 6,419,817 B1 | 7/2002 | Martin |
| 6,423,234 B1 | 7/2002 | Martin |
| 6,461,519 B1 | 10/2002 | Weltzer |
| 6,464,867 B1 | 10/2002 | Morita et al. |
| 6,468,433 B1 | 10/2002 | Tribelski |
| 6,503,464 B1 | 1/2003 | Miki et al. |
| 6,596,148 B1 | 7/2003 | Belongia et al. |
| 6,620,315 B2 | 9/2003 | Martin |
| 6,623,647 B2 | 9/2003 | Martin |
| 6,645,400 B2 | 11/2003 | Martin |
| 6,716,359 B1 | 4/2004 | Dennis, II |
| 6,776,926 B2 | 8/2004 | Martin |
| 6,780,328 B1 | 8/2004 | Zhang |
| 6,884,391 B1 | 4/2005 | Khoe et al. |
| 6,902,653 B2 | 6/2005 | Carmignani et al. |

(56) References Cited

U.S. PATENT DOCUMENTS

| | | |
|---|---|---|
| 6,942,779 B2 | 9/2005 | Belongia et al. |
| 6,991,733 B2 | 1/2006 | Kin et al. |
| 6,991,735 B2 | 1/2006 | Martin |
| 7,108,781 B2 | 9/2006 | Martin |
| 7,285,223 B2 | 10/2007 | Martin |
| 8,357,305 B2 | 1/2013 | Theodore et al. |
| 2001/0007314 A1 | 7/2001 | Sherman |
| 2002/0043650 A1 | 4/2002 | Martin |
| 2002/0117631 A1 | 8/2002 | Gadgil et al. |
| 2002/0152036 A1 | 10/2002 | Martin |
| 2003/0010695 A1 | 1/2003 | Kool et al. |
| 2003/0019803 A1* | 1/2003 | Woodard et al. ............. 210/175 |
| 2004/0005242 A1 | 1/2004 | Koulik et al. |
| 2004/0112838 A1 | 6/2004 | Martin |
| 2005/0029170 A1 | 2/2005 | Urquhart et al. |
| 2005/0056597 A1* | 3/2005 | Fries et al. ................. 210/748 |
| 2005/0199483 A1 | 9/2005 | Kroll |
| 2005/0218082 A1 | 10/2005 | Williamson et al. |
| 2006/0131245 A1 | 6/2006 | Dennis et al. |
| 2006/0169646 A1 | 8/2006 | Andree et al. |
| 2007/0102359 A1 | 5/2007 | Lombardi et al. |
| 2007/0119779 A1 | 5/2007 | Muramoto et al. |
| 2008/0149485 A1 | 6/2008 | Childers et al. |
| 2008/0152548 A1 | 6/2008 | Clark et al. |
| 2008/0179242 A1 | 7/2008 | Mukhopadhyay |
| 2008/0245738 A1 | 10/2008 | Coulter |
| 2009/0084734 A1* | 4/2009 | Yencho ....................... 210/741 |
| 2009/0145855 A1 | 6/2009 | Day et al. |
| 2010/0025337 A1 | 2/2010 | Yencho |
| 2011/0024361 A1 | 2/2011 | Schwartzel et al. |
| 2011/0171080 A1 | 7/2011 | Lo |
| 2011/0180485 A1 | 7/2011 | Sitkiewitz et al. |
| 2011/0209530 A1 | 9/2011 | Coulter |
| 2011/0210048 A1 | 9/2011 | Coulter |
| 2011/0210077 A1 | 9/2011 | Coulter |
| 2011/0210266 A1 | 9/2011 | Coulter |
| 2011/0210267 A1 | 9/2011 | Coulter |
| 2011/0243665 A1 | 10/2011 | Theodore et al. |
| 2011/0259832 A1 | 10/2011 | Castillo Rivera et al. |
| 2011/0318237 A1 | 12/2011 | Woodling et al. |

FOREIGN PATENT DOCUMENTS

| | | |
|---|---|---|
| CN | 1539750 | 10/2004 |
| CN | 201473358 U | 5/2010 |
| DE | 262139 C | 11/1988 |
| DE | 4312417 A1 | 10/1994 |
| DE | 19530086 A1 | 2/1997 |
| DE | 19844179 A1 | 3/2000 |
| DE | 19949434 A1 | 4/2001 |
| EP | 0011776 A1 | 6/1980 |
| EP | 0257740 A1 | 3/1988 |
| EP | 0504621 A1 | 9/1992 |
| EP | 0616975 A2 | 9/1994 |
| EP | 1057784 A1 | 12/2000 |
| FR | 2672058 A1 | 7/1992 |
| GB | 2027004 A | 2/1980 |
| GB | 2281742 A | 3/1995 |
| GB | 2306463 A | 5/1997 |
| GB | 2426513 A | 11/2006 |
| JP | 59-150589 | 8/1984 |
| JP | 60-202792 A | 10/1985 |
| JP | 11-028479 A | 2/1999 |
| JP | 11-033542 A | 2/1999 |
| JP | 11-057752 A | 3/1999 |
| JP | 11-099395 A | 4/1999 |
| JP | 11-290878 A | 10/1999 |
| LU | 80951 A1 | 6/1979 |
| WO | 89/08728 A1 | 9/1989 |
| WO | 96/30307 A1 | 10/1996 |
| WO | 00/34760 A1 | 6/2000 |
| WO | 01/98558 A2 | 12/2001 |
| WO | 03/031338 A2 | 4/2003 |
| WO | 2004/108607 A1 | 12/2004 |
| WO | 2007/146671 A2 | 12/2007 |
| WO | 2008150541 A1 | 12/2008 |
| WO | 2009/096662 | 8/2009 |

OTHER PUBLICATIONS

"Chemtrol—PC3000 Controller," Product Literature from www.sbcontrol.com, printed Nov. 19, 1999.

"Chemtrol—PC6000 Controller," Product Literature from www.sbcontrol.com, printed Nov. 19, 1999.

"Louisiana Plant Uses New Technology for Dechlorination," reprinted from American City & County, Feb. 1994.

Acu-Trol, "AK100 Series" Product Literature (date unknown).

Acu-Trol, "AK100 Summary," Product Literature from www.acu-trol.com, printed Nov. 19, 1999.

Anipsitakis, George P. et al., "Transition Metal/UV-based Advanced Oxidation Technologies for Water Decontamination," Applied Catalysis B: Environmental 54 (2004), pp. 155-163.

Aquasol Controllers, Inc., "Aquasol SPC Specifications," Product Literature from www.aquasol.com, printed Nov. 19, 1999.

Aquasol Controllers, Inc., "Aquasol WTC Specifications," Product Literature from www.aquasol.com, printed Nov. 19, 1999.

Aquasol Controllers, Inc., "Aquasol WTC," Product Literature, (date unknown).

Aquasol Controllers, Inc., "What is a Controller?" Product Literature from www.aquasol.com, printed Nov. 19, 1999.

Aquasol Controllers: Chemical Automation for Pools and Spas, Product Literature (date unknown).

Batt, T. et al., "The Water Down Under," Parks & Recreation, Nov. 1999.

Bossard, G. et al., "Optimizing Chlorination/Dechlorination at a Wastewater Treatment Plant," reprinted from Public Works, Jan. 1995.

Brusamarello et al., "Analysis of Different Methods to Calculate Electrochemical Noise Resistance Using a Three-Electrode Cell," Corrosion, vol. 56, No. 3, Mar. 2000, pp. 273-282.

Carlson, S., "Fundamentals of water disinfection," J Water SRT—Aqua, vol. 40, No. 6, (1991), pp. 346-356.

Carpenter, Colleen et al., "Chlorine Disinfection of Recreational Water for *Cryptosporidium parvum*," Emerging Infectious Diseases, vol. 5, No. 4, Jul.-Aug. 1999, pp. 579-584.

Cat Controllers, "CAT 2000+ Programmable Water Chemistry Controller," Product Literature (date unknown).

Chemtrol Automatic Pool Controllers, Product Literature from www.sbcontrol.com, printed Nov. 19, 1999.

Cooper, J.F. et al., Final Report: Fiscal Year 1997 Demonstration of Omnivorous Non-Thermal Mixed Waste Treatment Direct Chemical Oxidation of Organic Solids and Liquids using Peroxydisulfate, Lawrenec Livermore National Laboratory, Jan. 1998.

D'Adam, D. et al., "A Case Study of Wastewater Plant Disinfection," reprinted from Public Works Magazine, Nov. 1994.

Dexter et al., "Use and Limitations of Electrochemical Techniques for Investigating Microbiological Corrosion", Corrosion, 1991, vol. 47, No. 4, pp. 308-318.

Eddington, Gordon, "Successfully Managing Wastewater Chlorination," Stranco Product Literature (date unknown).

Frazier, B., "Automation to the Rescue," Aquatics International, May-Jun. 1998.

Gusmano et al., "Electrochemical Noise Resistance as a Tool for Corrosion Rate Prediction", Corrosion, 1997, vol. 53, No. 11, pp. 860-868.

Hetzler, J.T. et al., "ORP: A Key to Nutrient Removal," Operations Forum, vol. 12, No. 2, Feb. 1995.

Kim, Yong H., "Evaluation of Redox Potential and Chlorine Residual as a Measure of Water Disinfection," presented at the 54th International Water Conference, Pittsburgh, PA, Oct. 11-13, 1993.

Kim, Yong H., "On the Activation of Polymeric Flocculants," AIChE Annual Spring Meeting, Houston, TX, Apr. 2-6, 1989.

Kiser, P. et al., "ORP or Residual: Which Measures Oxidation?" Sep. 10, 1992, pp. 1-7.

(56) References Cited

OTHER PUBLICATIONS

Kloberdanz, B., "The Air in There: Enhancing an Indoor Pool Environment," Recreation Management, 2000.
Kowalsky, L., "Pool-Spa Operators Handbook," National Swimming Pool Foundation, 1983-1990.
Krone, D., "Automated Water Chemistry Control at University of Virginia Pools," Facilities Manager, vol. 13, No. 6, Nov./Dec. 1997.
Lund et al., "The Effect of Oxidation and Reduction on the Infectivity of Poliomyelitis Virus," from the Virological Laboratory of the Department of Bacteriology, University of Gothenburg, and the Virological Department of the Municipal Laboratories, Gothenburg, Sweden, Springer-Verlag, (1961), pp. 100-110.
Lund, E., "Inactivation of Poliomyelitis Virus by Chlorination at Different Oxidation Potentials," from the Virological Laboratory of the Department of Bacteriology, University of Gothenburg, and the Virological Department of the Municipal Laboratories, Gothenburg, Sweden, Springer-Verlag, (1961), pp. 330-342.
Lund, E., "Oxidative Inactivation of Poliovirus," from the Virological Laboratory of the Department of Bacteriology, University of Gothenburg, and the Virological Department of the Municipal Laboratories, Gothenburg, Sweden, Springer-Verlag, (1963), pp. 1-49.
Lund, E., "The Rate of Oxidative Inactivation of Poliovirus and its Dependence on the Concentration of the Reactants," from the Virological Laboratory of the Department of Bacteriology, University of Gothenburg, and the Virological Department of the Municipal Laboratories, Gothenburg, Sweden, Springer-Verlag, (1963), pp. 1-18.
Lund, E., "The Significance of Oxidation in Chemical Inactivation of Poliovirus," from the Virological Laboratory of the Department of Bacteriology, University of Gothenburg, and the Virological Department of the Municipal Laboratories, Gothenburg, Sweden, Springer-Verlag, (1963), pp. 1-13.
Lynntech, Inc., "Electrochemical Ozone Generator," Model 124 Product Literature (date unknown).
Mansfeld et al., "Electrochemical Noise Analysis of Iron Exposed to NaCl Solutions of Different Corrosivity," J. Electrochem. Soc., vol. 141, No. 5, May 1994, pp. 1402-1404.
Mikkelson, Ken, et al., "Development of the AquaMB ProcessTM", Aqua-Aerobic Systems, Inc., 2003.
Minton, E., "On the Waterpark," Swimming Pool/Spa Age (date unknown).
Normenausschusse Wasserwesen, "Treatment and disinfection of water used in bathing facilities," DIN 19643-1, Apr. 1997.
Normenausschusse Wasserwesen, "Treatment and disinfection of water used in bathing facilities," DIN 19643-2, Apr. 1997.
Normenausschusse Wasserwesen, "Treatment and disinfection of water used in bathing facilities," DIN 19643-3, Apr. 1997.
Normenausschusse Wasserwesen, "Treatment and disinfection of water used in bathing facilities," DIN 19643-4, Feb. 1999.
Notification of Transmittal of the International Search Report and the Written Opinion of the International Searching Authority for International Application No. PCT/US2010/043809, dated Jan. 28, 2011.
Nowell, Lisa H. et al., "Photolysis of Aqueous Chlorine at Sunlight and Ultraviolet Wavelengths-II. Hydroxyl Radical Production," Water Research, vol. 26, No. 5, May 26, 1992, pp. 599-605, Marsh Barton, Exeter, Great Britain.
Pool and Spa Controller: Acu-200 Pool Management Software, Product Literature (date unknown).
Rola-Chem Corporation, "The New Wave in Water Management: Take Control with Rola-Chem," Product Catalog, Apr. 1999.
Ryan, D. et al., "Waste Not, Want Not: Avoiding Chemical Excesses," reprinted from Operations Forum, vol. 11, No. 4, Apr. 1994.
Acu-Trol Programmable Controllers, "AT-8 Programmable Chemical Controller," Product Literature, 2006.
Acu-Trol, "Acu-Trol Programmable Controllers: AK100 Series and AK200," Product Literature (date unknown).
Hensley, R. et al., "Disinfection Metamorphosis: From Chemicals to Control," Operations Forum, vol. 12, No. 4, Apr. 1995.
Santa Barbara Control Systems, "Chemtrol™ PC Programmable Controllers: Integrated Water Treatment with Remote Control," Product Literature, (date unknown).
U.S. Filter/Stranco, "Environmental Control System Training Meeting, Mar. 15, 2000".
U.S. Filter/Stranco, "Strantrol ECS—Environmental Control System (For Pool)," 2000.
Sadik W/ & G. Shama, Uv-induced Decolourization of an Azo Dye by Homogeneous Advanced Oxidation Process, pp. 310-313, 2002.
Scully et al., Disinfection Interference in Wastewaters by Natural Organic Nitrogen Compounds, Environ. Sci. Techn., vol. 30, No. 5, 1996, pp. 1465-1471.
Selvick, E., "Take Control of 'Yo-Yo' Treatment Cycles," International Aquatics, National Trade Publications, Inc., Jul./Aug. 1997.
Stranco, "Solutions: Effluent Dechlorination", Stranco Product Literature (date unknown).
Stranco, "The Best of Poolfax," The Poolfax Newsletter, 1981-1984.
Strand, R. et al., "ORP As a Measure of Evaluating and Controlling Disinfection in Potable Water," (Source and date unknown).
U.S. Filter/Stranco, "Abstracts of Strancol ECS Case Histories," (date unknown).
U.S. Filter/Stranco, "Air & Water Quality Control for Indoor Aquatic Facilities," U.S. Filter Corporation, 1998.
U.S. Filter/Stranco, "ECS-Pool (w/CHF-150) Engineering Packet," Apr. 22, 1999.
U.S. Filter/Stranco, "Environmental Control at Indoor Pool Complex: New ECS System Optimizes Air & Water Quality at Colorado Recreation Center," Stranco Products Capsule Case History #807, Nov. 1998.
U.S. Filter/Stranco, "Environmental Control at Indoor Pool: ECS System Eliminates Chronic Air Quality Problems at High School and Parks District Indoor Pool Facility," Stranco Products Capsule Case History #813, Jul. 2000.
U.S. Filter/Stranco, "Environmental Control at Indoor Pool: ECS System Optimizes Air & Water Quality at Iowa Recreation Center," Stranco Products Capsule Case History #814, May 2000.
U.S. Filter/Stranco, "Environmental Control at Indoor Pool: ECS System Optimizes Air & Water Quality at Texas School District Swim Center," Stranco Products Capsule Case History #811, Nov. 1999.
U.S. Filter/Stranco, "Environmental Control at Indoor Pool: New ECS System Eliminates Chronic Air Quality Woes for New York School District Pool," Stranco Products Capsule Case History #806, Jul. 1998.
U.S. Filter/Stranco, "Environmental Control at Indoor Pool: Parks District Uses New ECS System to Eliminate Chronic Air Quality Problems at High School Pool," Stranco Products Capsule Case History #808, May 1999.
U.S. Filter/Stranco, "Environmental Control at Special Indoor Pool: New ECS System Eliminates Chronic Air Quality Woes in School District Pool & Spa Serving Special Needs Children," Stranco Products Capsule Case History #812, Oct. 1999.
U.S. Filter/Stranco, "Remote Monitoring for Unstaffed Pools," Parks & Recreation, Nov. 1997.
U.S. Filter/Stranco, "Ryznar Stability Index the 3rd Dimension Needed for Proper 'Water Balance,'" Aquatic Technology Newsletter, vol. 1, No. 1, pp. 1-3.
U.S. Filter/Stranco, "Strantrol Automated Water Chemistry Control for Commercial Pools," 1998.
U.S. Filter/Stranco, "Strantrol System 3 Pool & Spa Chemistry Controller," 2000.
U.S. Filter/Stranco, "Strantrol System 4 Pool & Spa Chemistry Controller," 2000.
U.S. Filter/Stranco, "Strantrol System5F Pool & Spa Chemistry Controller," 2000.
U.S. Filter/Stranco, "Strantrol System6 Pool Chemistry & Filter Backwash Controller," 2000.
U.S. Filter/Stranco, "Strantrol System7 Mechanical Room Controller for Aquatic Facilities," 2000.
U.S. Filter/Stranco, "The Chemistry and Control of Chloramines," Aquatic Technology Newsletter, vol. 1, No. 4, 1999, pp. 1-5.
U.S. Filter/Stranco, "The Relationship of ORP to PPM and Its Automated Control," Aquatic Technology Newsletter, vol. 1, No. 3, 1999, pp. 1-5.

(56) References Cited

OTHER PUBLICATIONS

U.S. Filter/Stranco, "Total Dissolved Solids, Friend or Foe?", Aquatic Technology Newsletter, vol. 1, No. 2, 1988; pp. 1-7.
U.S. Filter/Stranco, "Why Do I Have Algae in My Pool?" Aquatic Technology Newsletter, vol. 1, No. 6, 1999, pp. 1-2.
U.S. Filter/Stranco, "Yes, Your Pool Needs Calcium Too," Aquatic Technology Newsletter, vol. 1, No. 5, pp. 1-3.
Victorin et al., "Redox potential measurements for determining the disinfecting power of chlorinated water," J. Hyg., Camb., 70, 1972, pp. 313-323.
White, Geor. Clifford, Handbook of Chlorination and Alternative Disinfectants, Third Edition, (date unknown), pp. 801, 803-809, 922-924.
Williams, K., "Aquatic Facility Operator Manual," National Recreation and Park Association, Second Edition, 1995.

* cited by examiner

BAFFLE PLATES FOR AN ULTRAVIOLET REACTOR

CROSS REFERENCE TO RELATED APPLICATIONS

This application claims the benefit under 35 U.S.C. §119(e) of U.S. Provisional Application No. 61/230,040 entitled ULTRAVIOLET TANK BAFFLE DESIGN FOR ADVANCED OXIDATION PROCESS, filed on Jul. 30, 2009 and of U.S. Provisional Application No. 61/230,045 entitled ULTRAVIOLET TANK BUFFER DESIGN USING DIVERTER PLATE filed on Jul. 30, 2009 each of which is herein incorporated by reference in their entirety and to which this application claims the benefit of priority.

FIELD OF THE INVENTION

This invention relates to ultraviolet reactors, and more particularly, to baffle plates having a predetermined hole pattern for providing plug flow.

BACKGROUND OF THE INVENTION

An ultraviolet (UV) reactor may be used to disinfect water by rendering bacteria harmless or to energize oxidants to reduce total organic carbon (TOC). In certain applications, the UV reactor includes baffle plates to provide plug flow with respect to inlet water so as to maximize the exposure time of the water to UV radiation. Plug flow may be defined as flow across the entire cross section of a vessel that is within a small velocity range. However, a desirable plug flow is not met by many available reactors due to the design of the baffle plates.

FIG. 1 depicts a computational fluid dynamics (CFD) study which shows flow vectors for a conventional reactor. FIG. 1 will be described in conjunction with selected elements of a conventional reactor. Water 10 enters an inlet pipe 12 and flows through a UV chamber 14 at a much higher velocity than a targeted plug flow velocity. Due to the configuration of the reactor, the water flows around a side of a tank 16 and subsequently exits through an outlet pipe 18. Flows along a side wall of the tank 16 are not desirable as they have a strong tendency to create a short circuit path as shown by arrow 20 in FIG. 1. A short circuit path may be defined as passage through the UV chamber 14 at a velocity that is much higher than a desired plug velocity. Thus, a substantial portion of the water in the UV chamber 14 is not subjected to sufficient UV energy.

In FIG. 1, areas A, B, C and D depict velocities of greater than approximately 14.25, 0.75, 0.75 and 3.75 in/s, respectively, that exist in a conventional reactor, thus indicating that desirable plug flow does not exist. In addition, it has been determined that conventional reactors may have a velocity profile which exceeds 7 in/s which is known to be an undesirably high flow velocity for a UV reactor.

SUMMARY OF THE INVENTION

An ultraviolet reactor for treating a fluid is disclosed. The reactor includes a vessel having an inlet for receiving fluid and an outlet for discharging fluid. The reactor further includes an ultraviolet light source and baffle plates. The baffle plates include holes arranged in a predetermined pattern for providing plug flow in areas in the reactor near the ultraviolet light source.

DESCRIPTION OF THE INVENTION

Figure 1:
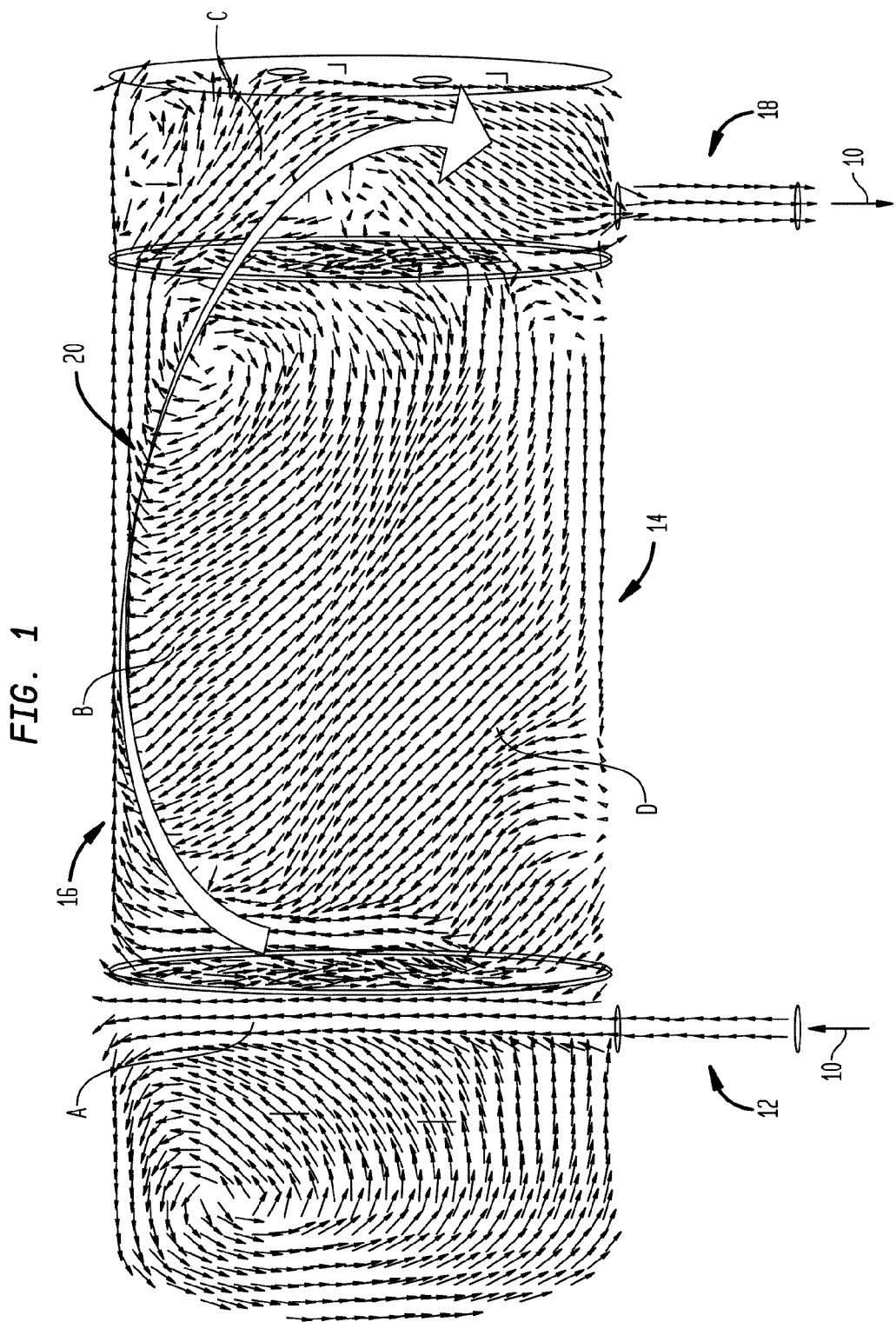
FIG. 1 depicts a computational fluid dynamics (CFD) study which shows flow vectors for a conventional reactor.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. In the description below, like reference numerals and labels are used to describe the same, similar or corresponding parts in the several views of FIGS. 1-8.

Figure 2:
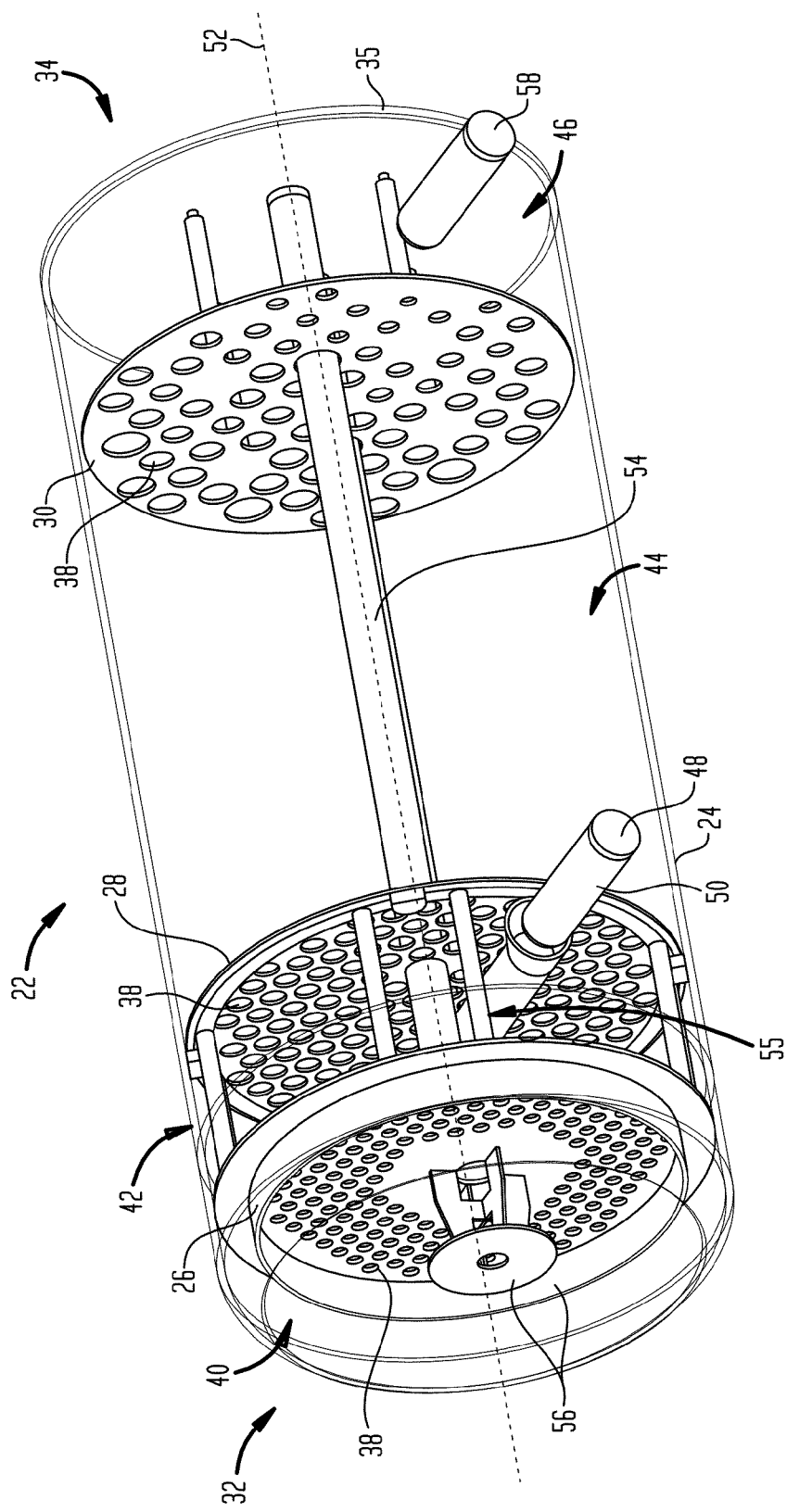
FIG. 2 is depicts an embodiment of a UV reactor which includes baffle plates in accordance with an embodiment of the current invention.

In one embodiment, the current invention is directed to a new baffle plate configuration for providing flow that meets a plug flow requirement in a UV reactor. Referring to FIG. 2, a UV reactor 22 in accordance with current embodiment is shown. The reactor 22 includes a vessel 24 (shown as a partial cross sectional view) and first 26, second 28 and third 30 baffle plates which are spaced apart from each other. The first 26 and third 30 baffle plates are located adjacent inlet 32 and outlet 34 ends, respectively, of the reactor 22. The inlet 32 and outlet 34 ends are located at opposite ends of the reactor 22 and include a domed portion 36 and an end plate 35, respectively. The first 26, second 28 and third 30 baffle plates include a plurality of holes 38 which are arranged in a predetermined pattern and sized for controlling fluid flow as will be described. The first baffle plate 26 and the domed portion 36 form a first chamber 40. The first 26 and second 28 baffle plates form a second chamber 42. The second 28 and third 30 baffle plates define a UV chamber 44. The third baffle plate 30 and the end plate 35 form an exit chamber 46.

The reactor 22 further includes an inlet pipe 48 for receiving water into the second chamber 42 and an outlet pipe 58 for discharging water from the exit chamber 46. A first inlet portion 50 of the inlet pipe 48 is oriented substantially perpendicular to a longitudinal axis 52 of the reactor 22. A second inlet portion 55 of the inlet pipe 48 is oriented substantially collinear with the longitudinal axis 52. Alternatively, the orientation of the second inlet portion 55 may be angled relative to the longitudinal axis 52. The angle of the second inlet portion 55 may be adjusted as desired. The UV chamber 44 includes UV lamps 54 for providing UV light.

Figure 3:
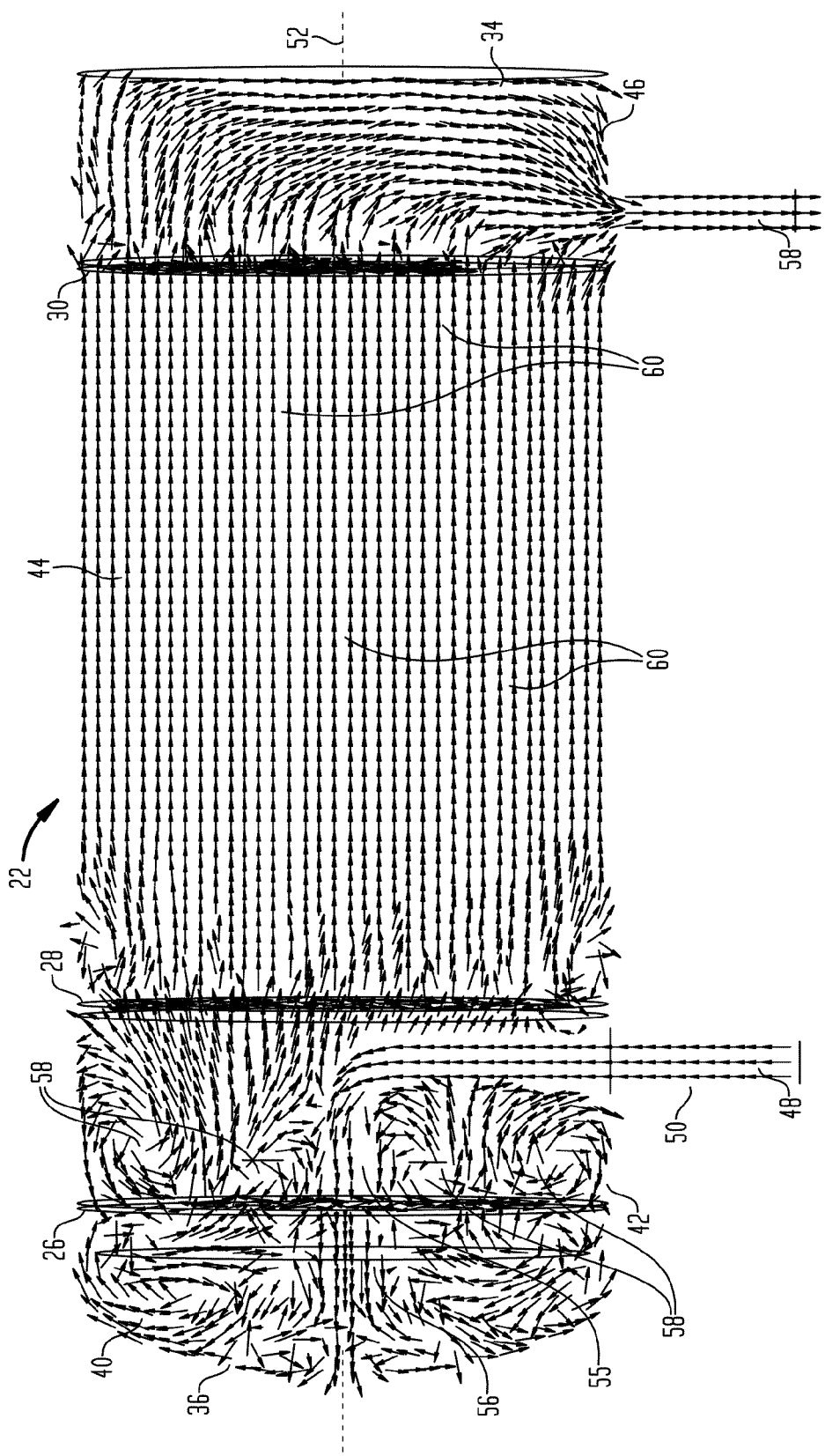
FIG. 3 illustrates a CFD study for the embodiment shown in FIG. 2.

Referring to FIG. 3, flow vectors (equal length) from a computational flow dynamics (CFD) study are shown for the configuration described in relation to FIG. 2. The flow vectors in FIG. 3 are shown in conjunction with selected elements of FIG. 2. In operation, inlet water flow enters the first inlet portion 50 at a selected rate such as 60 inches per second (in/s), for example. Inlet water flow from the first inlet portion 50 is then redirected into the first chamber 40 by the second inlet portion 55 and toward the domed portion 36. This serves to disperse a portion of the kinetic energy of the inlet water. Additional baffle plates 56 are placed along the path of the inlet water to further disperse the kinetic energy of the inlet water. The additional baffle plates 56 may be smaller in size than the first 26, second 28 and third 30 baffle plates. The water is then redirected by the domed portion 36 through the holes 38 in the first baffle plate 26 to the second chamber 42.

In the second chamber 42, the water velocity is reduced and the water flow is smoothed out between the first baffle plate 26 and the second baffle plate 28 due the size and arrangement of the holes 38 in the first 26 and second 28 baffle plates. In particular, the first baffle plate 26 includes rows of holes which are arranged such that the holes 38 are concentrated in a tight substantially circular pattern whereas the holes 38 on the second baffle plate 28 are substantially evenly spread as shown in FIG. 2. The holes 38 in the first baffle plate 26 are smaller in size which causes an inlet area of the first baffle plate 26 to be smaller than an inlet area of the second baffle plate 28. Referring to FIG. 3, these two features cause the formation of water eddies 58 and creates a slowly expanding cross sectional area along the second chamber 42. This slowly expanding cross sectional area reduces the water velocity and smooths out the water flow as shown in FIG. 3.

Next, the water flows into the UV chamber 44, where the UV lamps 54 are located. The second baffle plate 28 includes relatively large evenly spaced holes 38. The configuration of the holes 38 of the second baffle plate 28 causes substantial portions of the water entering the UV chamber 44 to enter at a similar low velocity across substantially all of the second baffle plate 28. This causes the water in the UV chamber 44 to achieve plug flow 60 across most of the UV chamber 44 length.

Figure 4:
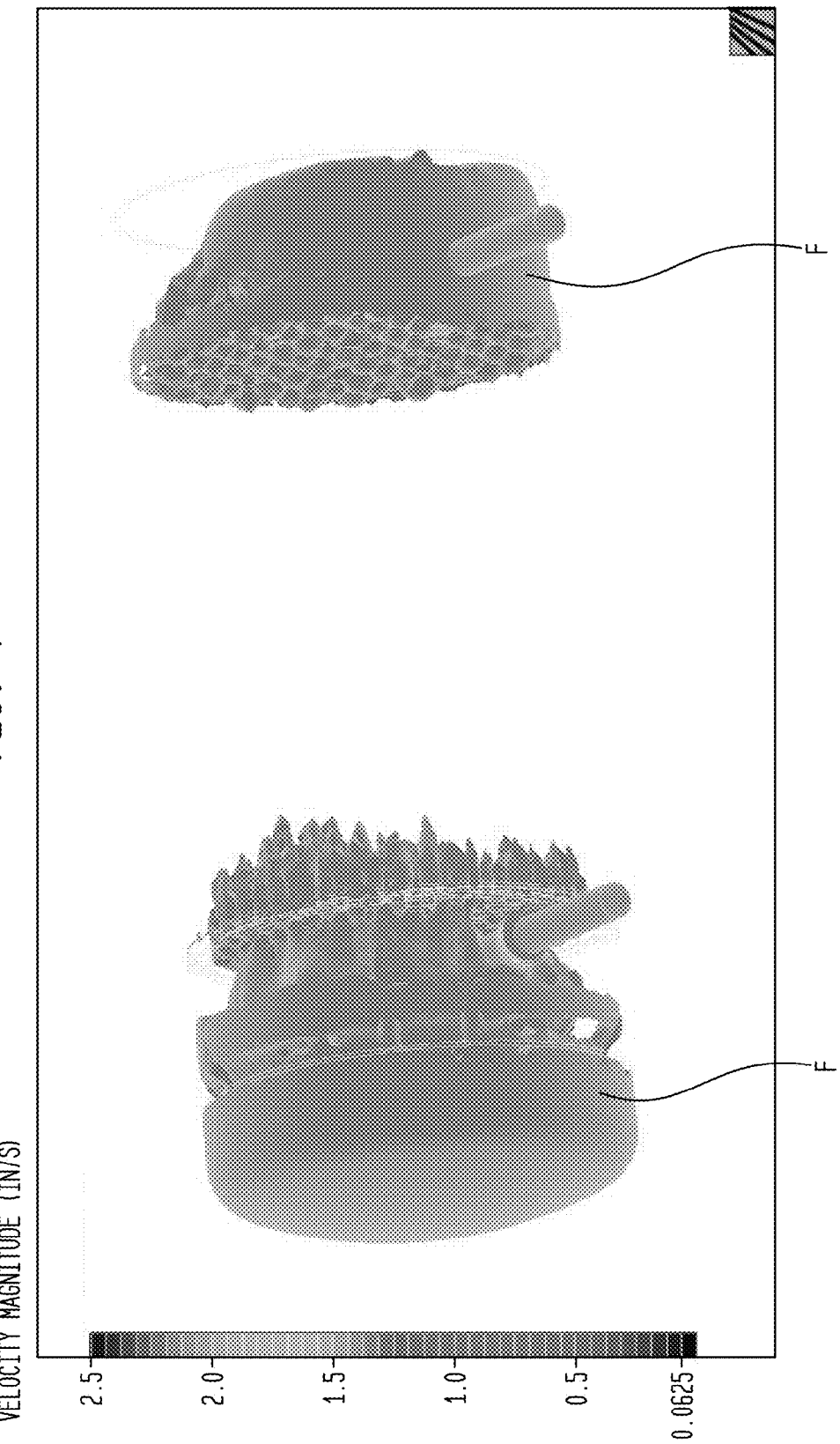
FIG. 4 is a CFD model and depicts a three dimensional flow profile of the reactor shown in FIG. 2.

The water then enters the exit chamber 46 and exits through the outlet pipe 58. The third baffle plate 30 includes a reducing hole pattern which helps to ensure that the flow entering the exit chamber 46 enters at a substantially similar velocity over all the holes 38 of the third baffle plate 30 as shown in FIG. 3. This ability of similar entry velocity will ensure that the flow nearing the third baffle plate remains plug flow. FIG. 4 is a CFD model and depicts a three dimensional flow profile of the reactor 22 and illustrates that a flow velocity of more than 0.6 in/s occurs mainly at the inlet 32 and outlet 34 ends (areas F) whereas the flow velocity in most of the reactor 22 is below 0.6 in/s.

Figure 5:
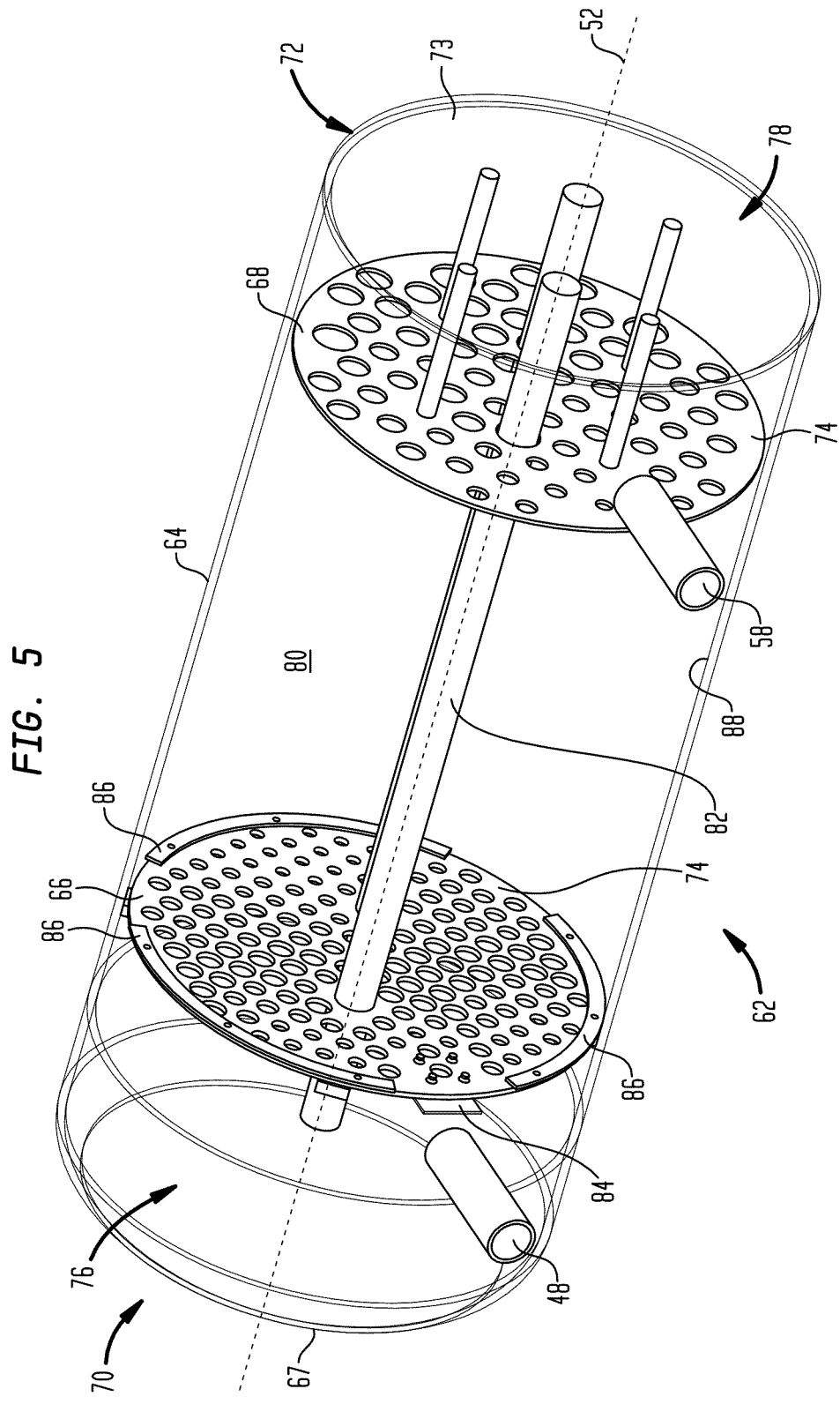
FIG. 5 depicts an alternate embodiment of a UV reactor which includes a diverter plate.
Figure 6:
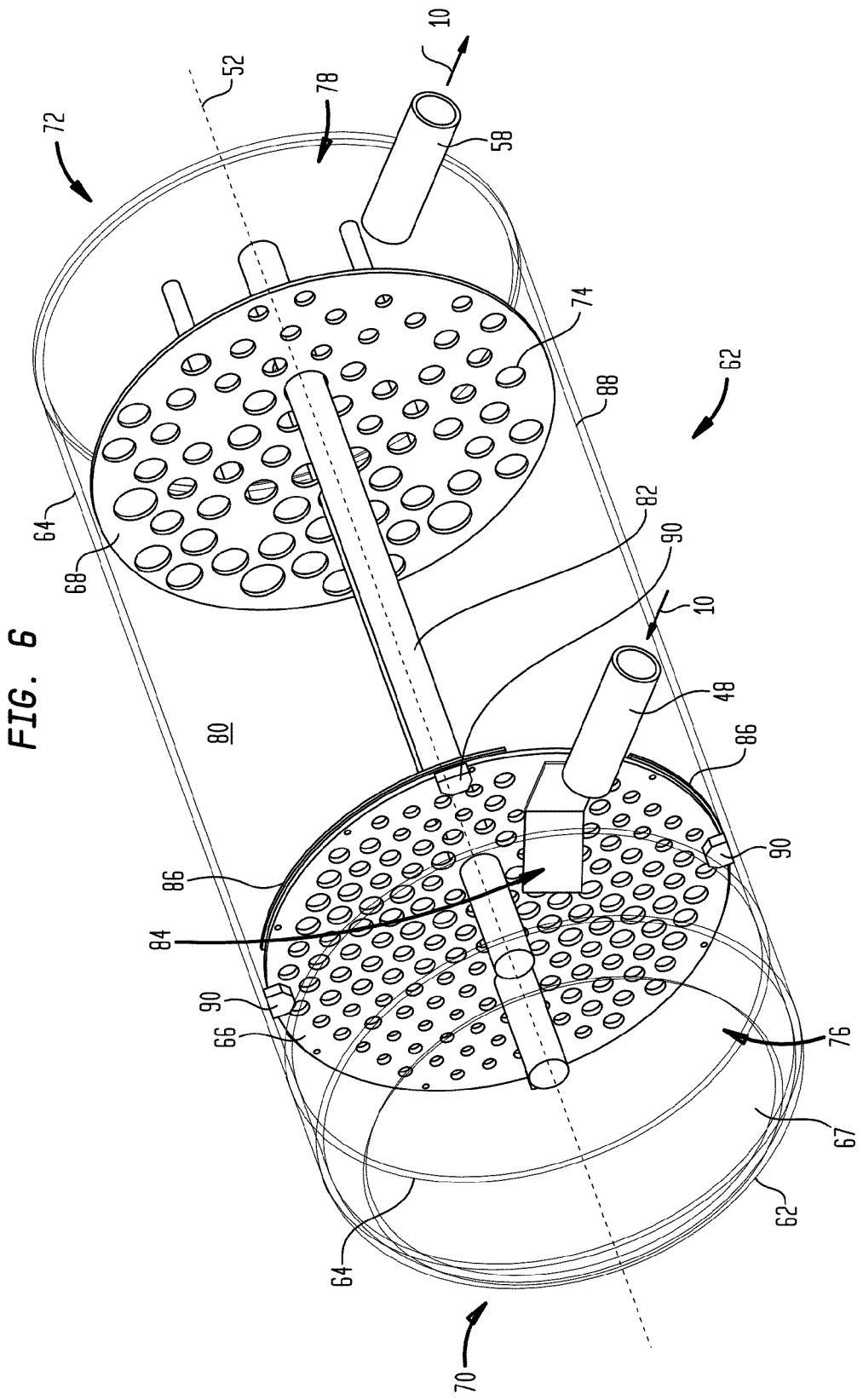
FIG. 6 is an alternate view of the embodiment shown in FIG. 5.

In another embodiment, the current invention is directed to a UV reactor having a baffle plate configuration which includes a diverter plate. Referring to FIGS. 5 and 6, a UV reactor 62 includes a vessel 64 (shown as a partial cross sectional view) and spaced apart inlet 66 and outlet 68 baffle plates located adjacent inlet 70 and outlet 72 ends, respectively, of the reactor 62. The inlet 62 and outlet 72 ends are located at opposite sides of the reactor 62 and include a domed portion 67 and an end plate 73, respectively. Both the inlet 66 and outlet 68 baffle plates include a plurality of holes 74 which are arranged in a predetermined pattern and sized for controlling fluid flow as will be described. The inlet baffle plate 66 and the domed portion 67 form an inlet chamber 76. The outlet baffle plate 68 and end plate 73 form an outlet chamber 78. The inlet 66 and outlet 68 baffle plates also form a UV chamber 80 which includes UV lamps 82 for providing UV light.

A diverter plate 84 is located on the inlet baffle plate 66 (FIG. 6). The diverter plate 84 may include a threaded rod in order to provide depth adjustment relative to the baffle plate 66. The length and width of the diverter plate 84 may be approximately 1.5 times the size of the inlet pipe 48, although it is understood that other dimensions may be used. The diverter plate 84 is angled relative to the inlet baffle plate 66. In one embodiment, the diverter plate 84 forms an approximately 120 degree angle relative to the inlet baffle plate 66. In another embodiment, the diverter plate 84 forms an approximately 87 degree angle. It is understood that other angles may be utilized as desired. Further, the diverter plate 84 may bend approximately at the center of the vessel 64. In another embodiment, the diverter plate 84 bends a short distance away from the inlet pipe 48. Alternatively, the angle of the diverter plate 84 may be adjustable so as to provide sufficient clearance between an end of the diverter plate 84 and the closest UV lamp. The inlet pipe 48 is located so that water enters the vessel 64 between the inlet baffle plate 66 and the domed portion 67 of the reactor 62.

In operation, inlet water 10 enters the inlet pipe 48 and into the inlet chamber 76 in a direction substantially perpendicular to the longitudinal axis 52 of the UV reactor 62. The inlet flow is then redirected in the inlet chamber 76 by the diverter plate 84 and toward the domed portion 67. This serves to disperse most of the kinetic energy of the inlet water and redirects the water toward the inlet baffle plate 66.

Side baffle plates 86 are located around an outer edge of the inlet baffle plate 66 to inhibit water from flowing along the interior wall 88 of the UV reactor 62 by closing a gap between the inlet baffle plate 66 and the interior wall 88. The side baffle plates 86 serve to stop undesirable flows along the interior wall 88 since such flows have a strong tendency to create a short circuit path as previously described. In one embodiment, three side baffle plates 86 are used although it is understood that more or less than three side baffle plates of various sizes may be used. Cleats 90 may be used to attach the side baffle plates 86 to the inlet baffle plate 66.

Figure 7:
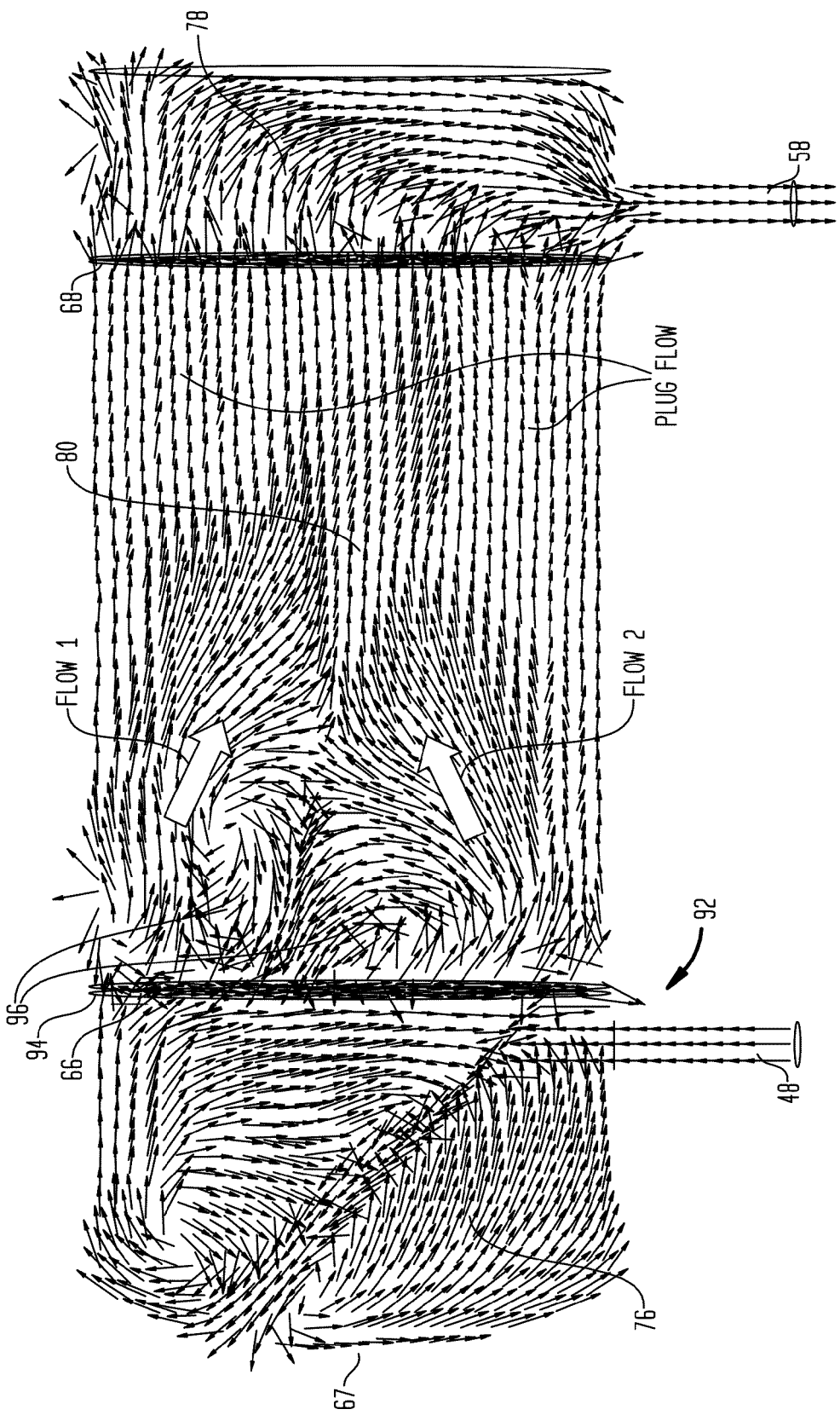
FIG. 7 shows flow vectors from a CFD study for the configuration described in relation to FIG. 5.
Figure 8:
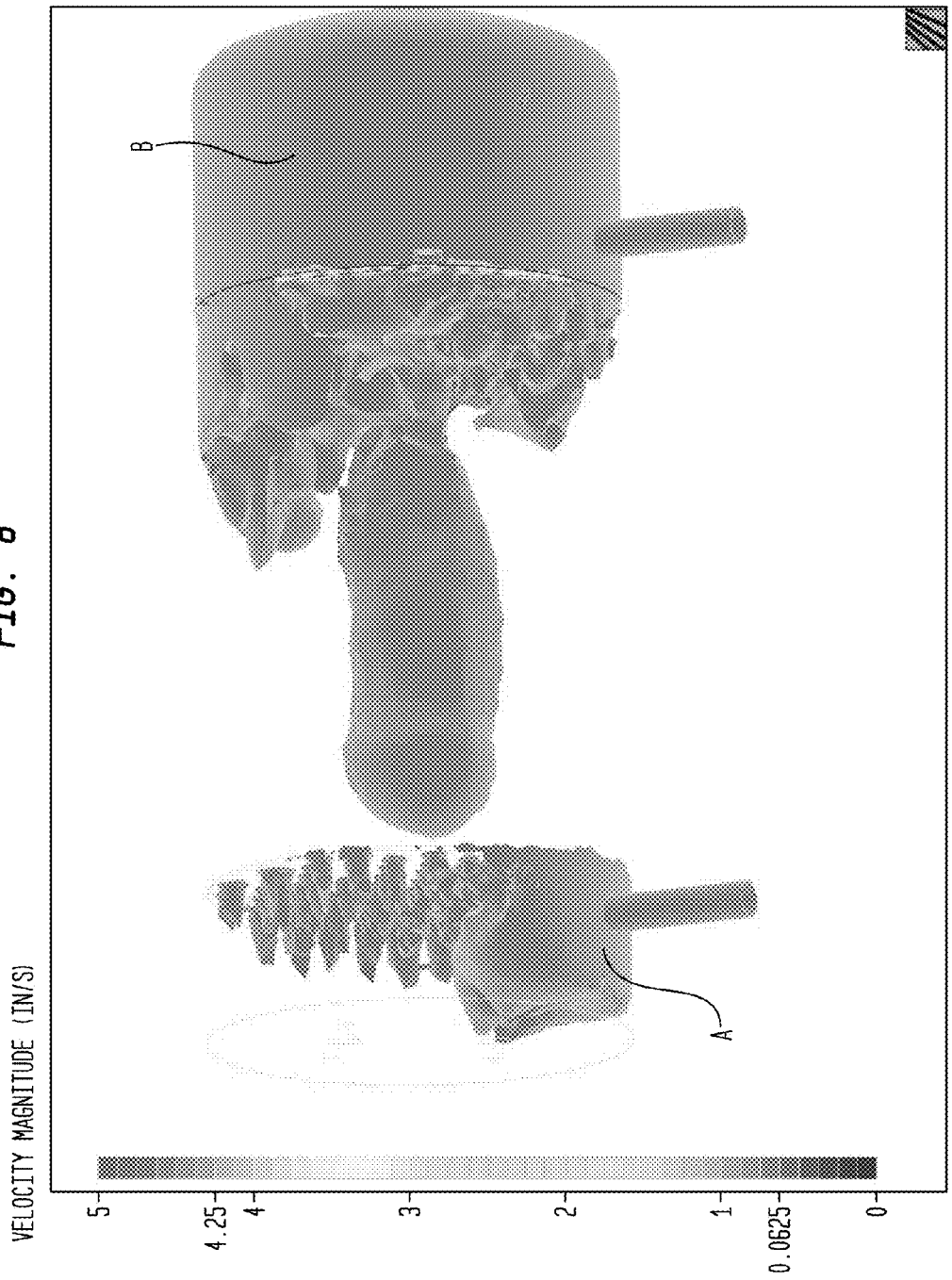
FIG. 8 depicts that a flow velocity profile for the configuration described in relation to FIG. 5.

Referring to FIG. 7, flow vectors (all velocity vectors set to same length setting) from a CFD study are shown for the configuration described in relation to FIGS. 5 and 6. The flow vectors in FIG. 7 are shown in conjunction with selected elements of FIGS. 5 and 6 to show operation of the present embodiment. The holes 74 in inlet baffle plate 66 are arranged and sized so that the water flowing into the UV reactor 62 flows in at a substantially similar velocity range. Due to the shape of the domed portion 67 and the arrangement and size of the holes 74, water enters the UV chamber 80 mainly through near 92 and far 94 ends, relative to the inlet pipe 48, of the inlet baffle plate 66 as shown in FIG. 7. This forms two flows (Flows 1 and 2 in FIG. 7) which converge near inlet baffle plate 66 and creates water eddies 96 between the two flows. The expansion of the two flows and the water eddies between Flows 1 and 2 serve to reduce the velocity of the water. With a reduced velocity, the water in the UV reactor 62 is able to achieve a desired plug flow across a large part of the UV reactor 62 length (approximately 0.6 in/s) (FIG. 7). Referring to FIG. 8, a CFD study is shown which depicts a three dimensional view of the flow in the UV reactor 62. FIG. 8 depicts that a flow velocity of greater than 1.5 in/s exists mainly near the inlet 76 and outlet 78 chambers (areas A and B, respectively) whereas within most of the UV chamber 80 the flow velocity is less than 1.5 in/s.

The water then enters the outlet chamber 78 and exits through the outlet pipe 58. The hole pattern in the outlet baffle plate 68 serves to ensure that the flow entering the outlet chamber 78 enters at a similar velocity over substantially all of the holes 74 of the outlet baffle plate 68. This ensures that the flow nearing the outlet buffer plate 68 remains plug flow (FIG. 7).

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations.

What is claimed is:

1. A reactor for treating a fluid, comprising:
    a vessel having a first end, an inlet proximate to said first end for receiving fluid and an outlet for discharging fluid, said first end comprising a domed portion;
    an ultraviolet light source located within said vessel;
    a first baffle plate and a second baffle plate located within said vessel, wherein said first and second baffle plates include holes configured and arranged in a predetermined pattern; and
    a diverter plate located on said first baffle plate, wherein said diverter plate is angled relative to said first baffle plate to redirect inlet fluid toward said domed portion of said vessel.

2. The reactor according to claim 1, wherein an orientation of said diverter plate is adjustable.

3. The reactor according to claim 1, further comprising side baffle plates constructed and arranged to close gaps between said first baffle plate and an interior wall of said vessel.

4. The reactor according to claim 3, wherein said reactor includes three side baffle plates.

5. The reactor according to claim 1, wherein said predetermined pattern of holes in said first and second baffles is configured to provide plug flow of said fluid.

6. The reactor according claim 1, wherein said diverter plate further comprises a threaded rod configured to provide depth adjustment relative to said first baffle plate.

* * * * *